Patented Nov. 9, 1948

UNITED STATES PATENT OFFICE 2,453,676

ALKAMINE ESTERS OF PYRROLE-3,4-DICARBOXYLIC ACIDS

Jackson P. Sickels, Plainfield, N. J., assignor to American Cyanamid Company, New York, N. Y., a corporation of Maine No Drawing. Application November 13, 1946, Serial No. 709,409

10 Claims. (Cl. 260—313)

This invention relates to alkamine esters of 1-alkylpyrrole-3,4-dicarboxylic acids.

Certain esters of 1-alkylpyrrole-3,4-dicarboxylic acids have been prepared by ordinary methods, but the alkamine esters are not known and cannot be readily prepared by ordinary means. It is with these esters that the present invention is concerned and they may be represented by the following structural formula:

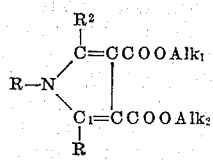

in which $Alk_1$ and $Alk_2$ are the same or different dialkylamino radicals, R is alkyl, and $R^1$ and $R^2$ are hydrogen or alkyl. The esters of the present invention are useful for a number of purposes, some being activators for rubber accelerators and some exhibiting local anaesthetic power.

The esters of the present invention may be prepared by catalyzed alcoholysis of the corresponding alkyl esters using an alkali metal alcoholate as the catalyst. The alkyl esters are in general prepared by known methods, notably the condensation of diacylsuccinates with primary alkylamines. The simplest and most readily prepared compounds are the ethyl esters of 2,5-dimethylpyrroles which are obtained by condensing diacetosuccinate with alkylamines. Other substituents in the 2,5 position may be prepared by using other diacylsuccinates such as dipropionosuccinates and the like.

The alkamine esters of the present invention are obtainable in the form of the free bases or in the form of their salts of strong acids, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless otherwise specified.

Example 1

Di-(β-diethylaminoethyl) 1,2,5-trimethylpyrrole-3,4-dicarboxylate dihydrochloride

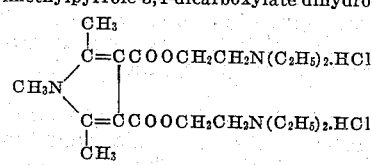

47 parts of diethyl-1,2,5-trimethylpyrrole-3,4-dicarboxylate are added to 500 parts of β-diethylaminoethanol in which 2½ parts of sodium have been dissolved. The mixture is gradually heated until it refluxes. The initial reflux temperature at the top of the reflux column is about 77.5° C. and this temperature is maintained until 20 parts of liquid have distilled over. The temperature then rises to about 159° C. and the excess β-diethylaminoethanol distills over. After all of the material which comes off with the reflux column has been distilled over refluxing is stopped and excess diethylaminoethanol is removed by distillation under about 18 mm. pressure. The residue is then dissolved in ether, the solution washed with water, and the ether layer dried. The dihydrochloride of the free base is then precipitated by the addition of an excess of dry hydrogen chloride in ether and is in the form of a dark reddish-brown viscous liquid. After decanting the supernatant ether the oil is dissolved in butyl alcohol, warmed, and ether added until turbid. On seeding with crystals and cooling a precipitate is obtained in the form of a light grey powder, which is filtered, washed with ether and dried under a vacuum. A good yield is obtained of a product having a melting point of 192.3–194° C.

The procedure of Example 1 is carried out with substituting equivalent amounts of dimethyl-1,2,5-trimethylpyrrole-3,4-dicarboxylate. The process proceeds in the same manner except that the temperature at the top of the reflux column corresponds to that at which methyl alcohol boils off. The identical products are obtained.

Example 2

Di(γ-diethylaminopropyl) 1,2,5-trimethylpyrrole-3,4-dicarboxylate dihydrochloride

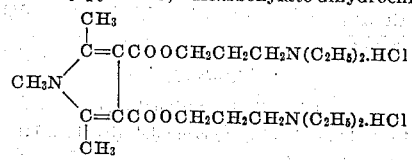

75 parts of the normal potassium salt of 1,2,5-trimethylpyrrole-3,4-dicarboxylic acid are treated with 200 parts of thionyl chloride, the reaction mixture being cooled with ice. After a few moments the temperature of the reaction mixture is raised to 50° C. and is maintained at this temperature for a number of hours. After the reaction appears complete the thionyl chloride is distilled off under reduced pressure, the last traces removed azeotropically by distillation with successive portions of the benzene. The residue is then extracted with benzene, filtered, and 170 parts of γ-diethylaminopropanol slowly added to the reaction mixture, which is cooled to the temperature of cold water. After the addition of the alcohol is complete the reaction mixture is heated up to 45° C., and maintained at this temperature for a number of hours with vigorous agitation. Water is then added, together with 56 parts of potassium hydroxide to neutralize the hydrochloric acid set free. The basic solution is then extracted with benzene, the benzene solution dried and the γ-diethylaminopropanol removed by distillation under reduced pressure. The product remaining is then distilled under a high vacuum ($10^{-4}$ mm.) and comes over at 206–212° C. A good yield of the product is obtained and if desired it may be transformed into the hydrochloride by solution in dry ether and treatment with an excess of dry hydrogen chloride. The hydrochloride is then precipitated as described in connection with Example 1, recrystallized from butyl alcohol, and dried, giving a white crystalline powder melting at 205.5–207.5° C.

The purified hydrochloride may be retransformed into the base by treatment with a sodium hydroxide solution and extracting with ether. After distillation under high vacuum ($10^{-3}$ mm.) an oil is obtained which boils at 208–210° C. The oil is light greenish-yellow in color. The diethylaminoethyl ester may be prepared in the same manner as described above, substituting corresponding amounts of β-diethylaminoethanol for the γ-diethylaminopropanol.

*Example 3*

Di(γ-diethylaminopropyl) 1,2,5-trimethylpyrrole-3,4-dicarboxylate dihydrochloride

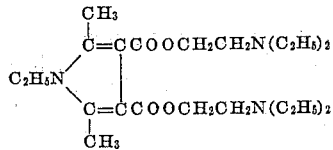

175 parts of diethyl-1,2,5-trimethylpyrrole-3,4-dicarboxylate are mixed with 550 parts of γ-diethylaminopropanol in which 2 parts of sodium have been dissolved. The reaction mixture is heated up to 135° C. and maintained at this temperature for a number of hours until reaction appears complete. The excess γ-diethylaminopropanol is then removed by distillation under a vacuum, the residue dissolved in ether, washed with water, dried, and the dihydrochloride prepared as described in Example 1. The product is a white solid which turns purple on long standing. On purification by recrystallizing from ordinary alcohol a product is obtained melting at 207–207.5° C.

*Example 4*

Di(β-diethylaminoethyl) 1-ethyl-2,5-dimethylpyrrole-3,4-dicarboxylate

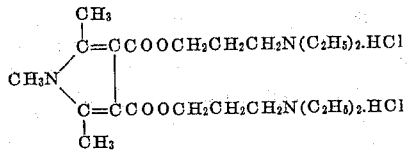

90 parts of diethyl-1-ethyl-2,5-dimethylpyrrole-3,4-dicarboxylate (prepared by condensing diethyldiacetosuccinate with ethylamine) are mixed with 500 parts of β-diethylaminoethanol in which from 3 to 4 parts of sodium have been dissolved. The reaction mixture is heated slowly until slow distillation commences. The initial distillation temperature is about 77.5° C. On further heating the temperature gradually rises to about 159° C. and then a vacuum is applied and excess β-diethylaminoethanol distilled off.

The residue is dissolved in ether, washed with water, dried and the ether removed. The residual oil is then distilled at 2 mm. pressure, boiling at 208–213° C. The product is a light yellow oil which can be transformed into the hydrochloride by the method set out in the previous examples.

*Example 5*

Di-(β-diethylaminoethyl) 1-(n-butyl)-2,5-dimethylpyrrole-3,4-dicarboxylate

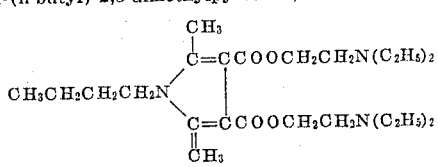

120 parts of diethyl-1-n-butyl-2,5-dimethylpyrrole-3,4-dicarboxylate (prepared by condensing diethyldiacetosuccinate with normal butylamine in glacial acetic acid solution) are mixed with 500 parts of β-diethylaminoethanol in which 2 parts of sodium have been dissolved. The reaction mixture is gradually heated and distillation is started through a fractionating column providing extensive reflux. The first material to distill comes over at about 78° C. and the temperature gradually rises to 155° C. Heating at this temperature is then continued for some time under reflux, whereupon the pressure is lowered to 15 mm. and the excess β-diethylaminoethanol distilled off.

The residue is dissolved in ether, washed with water, dried and the hydrochloride precipitated as described in Example 1. The hydrochloride does not solidify and is transformed into the base by dissolving in water and treating with potassium hydroxide to set the base free. The oily base is extracted with ether, dried, ether removed, and the residual oil distilled, boiling at 221–227° C. at about 2 mm. The product is a reddish-brown oil and is obtained in good yield.

*Example 6*

Di(β-diethylaminoethyl) 1-(n-butyl)-2,5-dimethylpyrrole-3,4-dicarboxylate

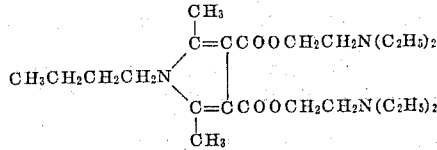

8 parts of 1-n-butyl-2,5-dimethylpyrrole-3,4-dicarboxylic acid are cooled and 35 parts thionyl chloride added. The acid rapidly dissolves to a red solution and after the solution is complete the reaction mixture is heated at 50° C. for several hours. Thionyl chloride is then removed by distillation under moderate vacuum, the last portions being removed by azeotropic distillation with benzene.

The residue is dissolved in 50 parts of dry benzene and 25 parts of β-diethylaminoethanol added. The reaction mixture is heated at 50° C. for several hours and water is then added together with sufficient potassium hydroxide to neutralize the hydrogen chloride freed in the reaction.

The ester is then extracted with ether, dried, and the ether and excess β-diethylaminoethanol removed by distillation. The residual oil is then distilled at 2 mm., a light yellow oil being obtained.

Example 7

Di-(γ-diethylaminopropyl)
1-(n-butyl)-2,5-dimethylpyrrole-3,4-dicarboxylate
dihydrochloride

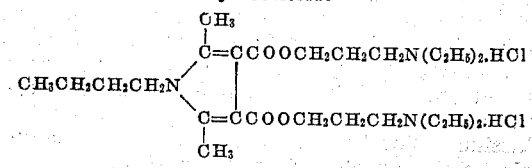

120 parts of diethyl-1-n-butyl-2,5-dimethylpyrrole-3,4-dicarboxylate, prepared as described in Example 5, are mixed with 500 parts of γ-diethylaminopropanol, together with a small amount of sodium. The reaction mixture is then heated and distillation started through a fractionating column providing a high ratio of reflux. After a considerable portion has distilled over the temperature rises to 187° C. and the excess amino alcohol is distilled off as described above, the residue dissolved in ether and washed with water.

The ether solution is then treated with hydrogen chloride as described in Example 1 to produce the hydrochloride, which solidifies on standing and is purified by recrystallization from butyl alcohol. The product is obtained in fair yield, melting at 133.5–134.5° C., being a greyish-white microcrystalline powder.

The hydrochloride from the mother liquor and from part of the crystal batches may be converted into the free base, dissolved in ether and purified by distillation under 2 mm. It comes over at 225–233° C.

Example 8

Di-(β-diethylaminoethyl)
1-isoamyl-2,5-dimethylpyrrole-3,4-dicarboxylate
dihydrochloride

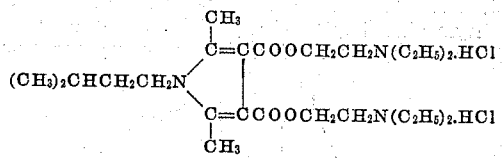

50 parts of 1-isoamyl-2,5-dimethyl-3,4-dicarbethoxypyrrole (prepared by condensing diethyldiacetosuccinate with isoamylamine in glacial acetic acid) are mixed with 500 parts of β-diethylaminoethanol in which 2½ parts of sodium have been dissolved. The reaction mixture is distilled through a fractionating column providing a large reflux ratio. Distillation starts at 77° C. and rises to 159° C., at which temperature the β-diethylaminoethanol distills off, the last traces of which are removed by lowering the pressure to 17 mm.

The residue is dissolved in ether, washed, dried, and the hydrochloride prepared by the method described in Example 1. It does not solidify. The hydrochloride is dissolved in water and the base freed by treatment with dilute potassium hydroxide solution. The base is taken up in ether, dried, the ether removed, and the residual oil distilled under about $10^{-3}$ mm. after removing a forefraction by heating up to 220° C. at 13 mm. The base is a light yellow oil which can be transformed into the hydrochloride by methods described in preceding examples. The hydrochloride is oily and is preferably dissolved in butyl alcohol and ether added. The product gradually solidifies, is filtered, washed with ether, dried, and a product obtained having a melting point from 125.5–130° C. Further product can be crystallized out in a second crop and on recrystallization from an acetone ether solution has approximately the same melting point.

Example 9

Di-(β-diethylaminoethyl)
1-isoamyl-2,5-dimethylpyrrole-3,4-dicarboxylate

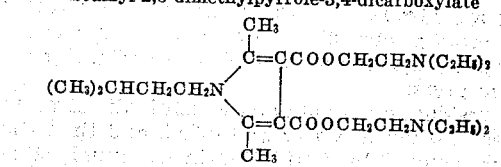

2½ parts of sodium are dissolved in 200 parts of β-diethylaminoethanol, the solution heated, and 30 parts of diethyl-1-isoamyl-2,5-dimethylpyrrole-3,4-dicarboxylate added. The pyrrole dicarboxylate is prepared by condensing diethyldiacetosuccinate with isoamylamine. The temperature is then raised until the reaction mixture begins to distill at about 79° C. and distillation is permitted to continue until the temperature slowly rises to 160° C., at which temperature the distillation is continued as long as distillate comes over. Then the pressure is lowered, and the excess β-diethylaminoethanol distilled off. The residue is dissolved in ether, washed with water, dried and transformed into the hydrochloride with hydrogen chloride in ether. The hydrochloride is oily and does not readily crystallize.

The hydrochloride is dissolved in water, transformed into the free base by the addition of a potassium hydroxide solution, extracted with ether and dried. The ether is then removed by distillation under reduced pressure and the residual oil distilled at 2 mm. It is a light yellow oil.

Example 10

β-diethylaminoethyl-1-n-hexyl-2,5-dimethylpyrrole-3,4-dicarboxylate

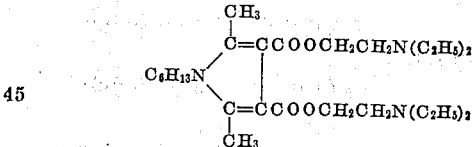

.7 part of sodium is added to 130 parts of β-diethylaminoethanol and after liberation of hydrogen has ceased 50 parts of diethyl-1-n-hexyl-2,5-dimethylpyrrole-4,3-dicarboxylate are added and the reacting mixture heated up until ethyl alcohol begins to distill over at 78–80° C. After the ethyl alcohol has distilled over the distillation temperature rises to 160° C., whereupon the pressure is reduced and the excess β-diethylaminoethanol distilled off.

The residue is a dark brown oil which is dissolved in ether, washed with dilute sodium chloride solution and then with water, and the ether layer dried. The ether is then removed and the ester distilled, product being obtained boiling at 255–265° C. (corr.) at 3 mm.

Example 11

β-diethylaminoethyl-1-n-decyl-2,5-dimethylpyrrole-3,4-dicarboxylate

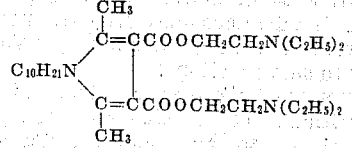

435 parts of β-diethylaminoethanol and 1.7 parts of sodium are mixed with 141 parts of diethyl-1-n-decyl-2,5-dimethylpyrrole-3,4 - dicarboxylate prepared by condensing diethyldiacetosuccinate with n-decylamine) and the reaction mixture boiled under reflux for several hours, care being taken to maintain the reaction mixture anhydrous. The temperature is then raised and ethyl alcohol distilled off and finally the excess β-diethylaminoethanol distilled off under reduced pressure.

A residual oil is obtained which is dissolved in ether, washed in water and dried, and then the ether removed by distillation in the usual manner and the residual oil fractionally distilled. A viscous fluorescent light yellow oil is obtained which is soluble in most organic solvents and dilute mineral acids, but is insoluble in water. It has a refractive index of slightly over 1.5.

*Example 12*

Di-(β-dimethylaminoethyl) 1,2,5-trimethylpyrrole-3,4-dicarboxylate-dihydrochloride

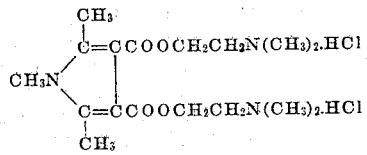

The procedure of Example 2 is followed, except that a stoichiometrically equivalent amount of β-dimethylaminoethanol is used in place of the 170 parts of β-diethylaminopropanol. A high boiling oil is obtained which is distilled under high vacuum. It can be transformed into the hydrochloride by dry hydrogen chloride as described in Example 2.

*Example 13*

Di-(γ-dipropylaminopropyl) 1-(n-butyl)-2,5-dimethylpyrrole-3,4-dicarboxylate

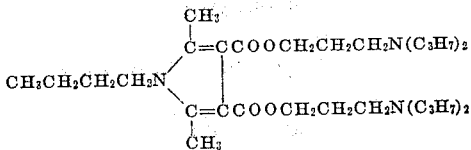

The procedure of Example 5 is followed substituting a stoichiometrically equivalent amount of γ-dipropylaminopropanol for the 500 parts of β-diethylaminopropanol, the reaction proceeds in the same manner producing a brown oily matter which is extracted, dried, the ether removed and the oil distilled over at a high vacuum.

In the foregoing examples the catalyst sodium is added to the dialkylaminoalkanol, where it, of course, reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say amounts which are sufficient to vigorously catalyze the reaction but far below stoichiometric proportions. Good results are obtained with amounts of alcoholate of the order of $\frac{1}{15}$ mole per mole of the dicarbethoxypyrrole. This proportion is not critical and the term "catalytic amounts" will be used in the claims in its ordinary sense of small amounts far below stoichiometric proportions. Sodium can be replaced by potassium, but this presents no advantage in the reaction and, therefore, does not economically warrant the higher cost of potassium. For this economic reason the sodium alcoholate is preferred as the catalyst.

In many of the examples the dihydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of my copending application Serial No. 496,963, filed July 31, 1943, now abandoned.

I claim:

1. A compound selected from the group consisting of esters of 1-alkylpyrrole-3,4-dicarboxylic acids with dialkylamino alkanols and salts of the esters with strong acids.

2. A compound selected from the group consisting of esters of 1,2,5-trialkylpyrrole-3,4-dicarboxylic acid with dialkylamino alkanols and salts of the esters with strong acids.

3. A compound selected from the group consisting of esters of 1-alkyl-2,5-dimethylpyrrole-3,4-dicarboxylic acid with dialkylamino alkanols and salts of the esters with strong acids.

4. A compound selected from the group consisting of di-(β-diethylaminoethyl)-1-alkyl-2,5-dimethylpyrrole-3,4-dicarboxylates and salts thereof with strong acids.

5. A member of the group consisting of di-(β-diethylaminoethyl)-1-butyl-2,5-dimethylpyrrole-3,4-dicarboxylate having the following formula:

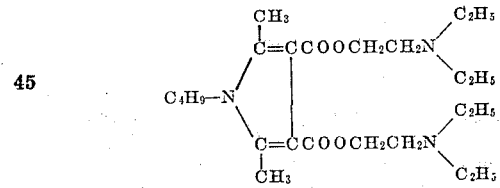

and its salts with strong acids.

6. A member of the group consisting of di-(β-diethylaminoethyl)-1-hexyl-2,5-dimethylpyrrole-3,4-dicarboxylate having the following formula:

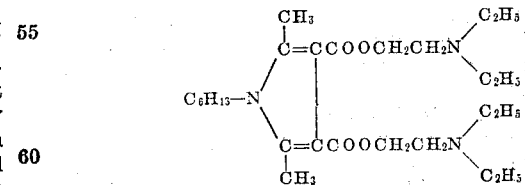

and its salts with strong acids.

7. A method of preparing a dialkamine ester of a 1-alkylpyrrole-3,4-dicarboxylic acid which comprises reacting a dialkyl ester of the same acid with the desired dialkylamino alkanol in the presence of a catalytic amount of alkali metal alcoholate, the dialkylamino alkanol being present in excess, the reaction being effected by heating to a temperature above that at which only a single ester group in each molecule is alcoholyzed, the heating being maintained until reaction is substantially complete.

8. A method of preparing a dialkamine ester of 1-alkyl-2,5 - dimethylpyrrole-3,4-dicarboxylic acid which comprises reacting a dialkyl ester of the same acid with the desired dialkylamino alkanol in the presence of a catalytic amount of alkali metal alcoholate, the dialkylamino alkanol being present in excess, the reaction being effected by heating to a temperature above that at which only a single ester group in each molecule is alcoholyzed, the heating being maintained until reaction is substantially complete.

9. A method according to claim 7 in which the dialkylamino alkanol is β-diethylaminoethanol.

10. A method according to claim 8 in which the dialkylamino alkanol is β-diethylaminoethanol.

JACKSON P. SICKELS.

No references cited.